Dec. 23, 1952   J. H. HALL   2,623,104
RECTIFIER ASSEMBLY
Filed Aug. 5, 1950   2 SHEETS—SHEET 1

INVENTOR.
James H. Hall
BY Albert G. McCaleb
atty

Dec. 23, 1952  J. H. HALL  2,623,104
RECTIFIER ASSEMBLY
Filed Aug. 5, 1950  2 SHEETS—SHEET 2

INVENTOR.
James H. Hall
BY Albert G. McCaleb
Att'y

Patented Dec. 23, 1952

2,623,104

UNITED STATES PATENT OFFICE 2,623,104

RECTIFIER ASSEMBLY

James H. Hall, Lake Bluff, Ill., assignor to Fansteel Metallurgical Corporation, North Chicago, Ill., a corporation of New York Application August 5, 1950, Serial No. 177,914

8 Claims. (Cl. 175—366)

This invention relates to a rectifier assembly, and more particularly to a rectifier assembly of the dry disc type which embodies parts, terminals and structural relationships adapting it particularly to ruggedness and heavy duty service.

The use, in buses, trucks and the like, of alternator-rectifier system for furnishing electrical power has brought about the need for a heavy duty rectifier of the dry disc type which is capable of withstanding the mechanical shock and vibrations encountered in such service. In such use, the relatively large electrical capacity required not only affects the size and mass of the rectifier assembly in itself, so as to increase the susceptibility thereof to damage by shock and vibration, but the heavy leads required subject the rectifier and its terminals to the mechanical forces and vibrations of such heavy leads or bus bars. As another incident of the large electrical capacity which accompanies the use referred to, the assembly must be adapted to mounting at a place in which there is an adequate supply of cooling air, somewhat irrespective of the disadvantages which such placement may have in respect to shock and vibration.

It is therefore one of the general objects of my invention to provide a rectifier assembly having the requisite ruggedness and electrical capacity to withstand service in an alternator-rectifier system of the type used in buses, trucks and the like.

As another object, this invention comprehends the provision of a rectifier assembly which is adapted, by structure and arrangement, to use as a part of a cooling air duct with the rectifier elements disposed in the duct, so as to be cooled by the flow of air therethrough.

My invention also has within its purview the provision of a supporting and terminal structure in a rectifier assembly which not only affords a solid and rugged anchorage for connecting bus bars or leads, but which effectively segregates the mechanical forces and vibrations of such bus bars or leads from the rectifier element.

Since excessive pressure on rectifying layers of selenium rectifiers and the like is detrimental to the operating characteristics of such rectifier assemblies, it is a further object of my invention to provide a rectifier assembly embodying structure and an arrangement of parts such that it will withstand shocks and vibration without the use of excessive pressure on the rectifying layers.

Other objects and advantages of the invention will be apparent from the following description and the accompanying drawings in which similar characters of reference indicate similar parts throughout the several views.

Referring to the two sheets of drawings.

Figure 2:
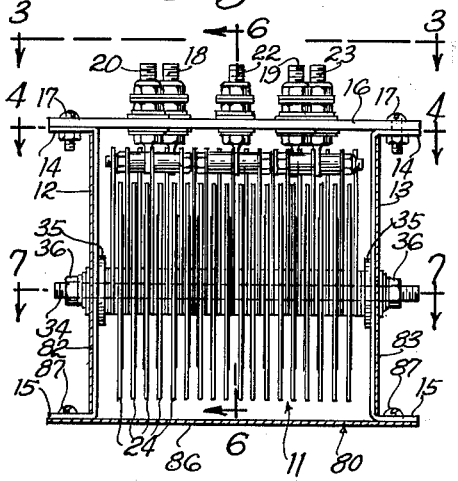
Figure 3:
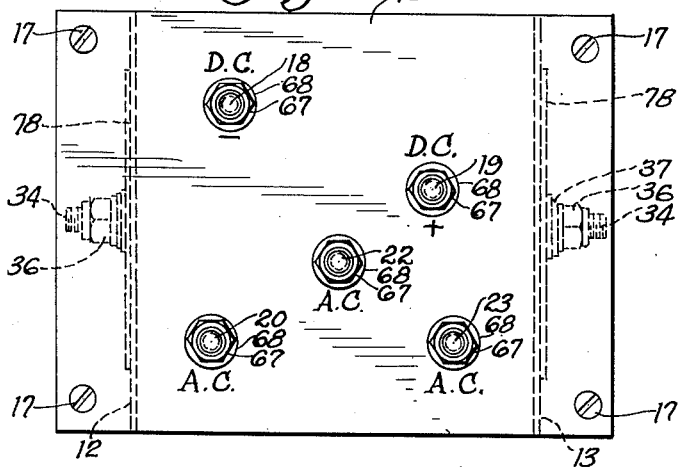
Fig. 3 is a top plan view of the structure illustrated in Fig. 2, drawn to a somewhat larger scale than Fig. 2, and viewed substantially as indicated by a line 3—3 in Fig. 2 and accompanying arrows.
Figure 6:
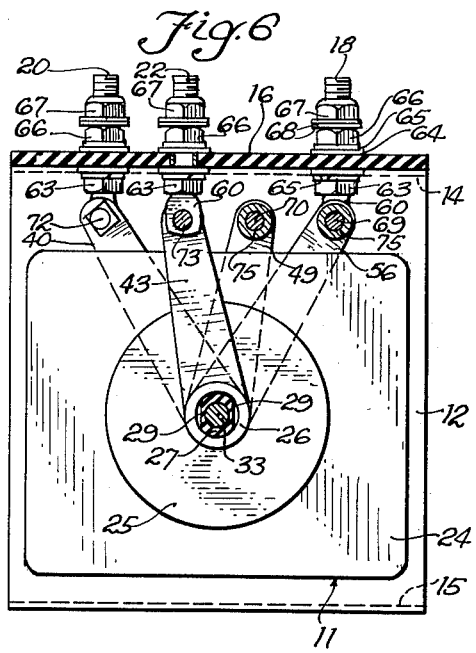
Figure 7:
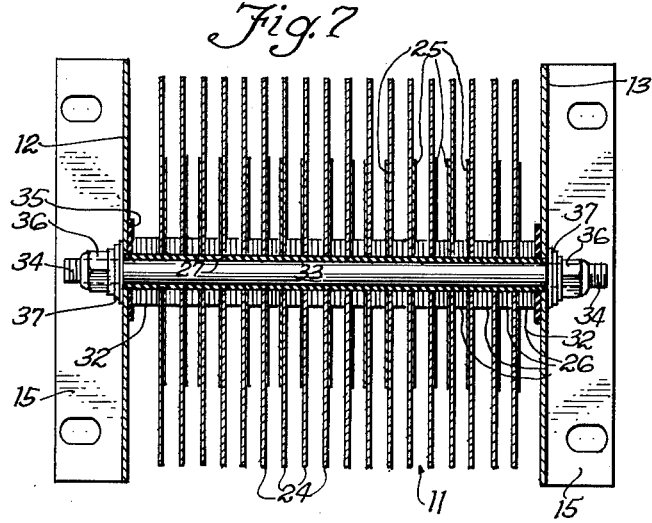
Figure 8:
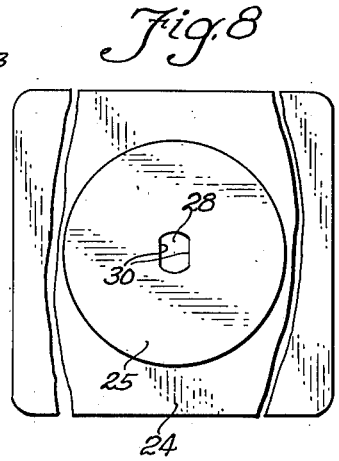
Figure 9:
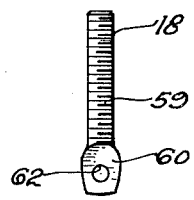

Figs. 6 and 7 are respectively end and top sectional views taken substantially on lines 6—6 and 7—7 of Fig. 2 and in the directions indicated by accompanying arrows;

Fig. 8 is an end elevational view of one element of my disclosed rectifier assembly; and Fig. 9 is a side elevational view depicting the structure of a preferred type of terminal utilized in my disclosed rectifier assembly.

In the exemplary embodiment of my invention which is depicted in the accompanying drawings for illustrative purposes, I have shown a rectifier assembly which is adapted to use on a three phase alternating current source, and to the provision of full wave rectification. In the rectifier art, it is known and well understood that various combinations of elements of the type herein disclosed can be arranged to provide either full or half wave rectification for either single or polyphase sources having various voltage ranges. As will be more readily understood as the description progresses, the invention herein disclosed is not necessarily limited to a particular class or type of rectifier stack, or the rectification of any certain number of phases.

Having reference to the accompanying drawings, my rectifier assembly includes, in general, a rectifier stack 11 mounted and supported between end supporting plates 12 and 13. In the disclosed structure, each of the end supporting plates has top and bottom flanges 14 and 15 respectively. A panel 16 which, in the present instance, is relatively rigid and made of insulating material, is secured to the top flanges 14 of the supporting plates by fastening means, such as screws 17, and extends between the supporting plates in spaced relationship to the top of the stack 11. Output terminals 18 and 19 and input terminals 20, 22 and 23 are mounted on the panel 16 in spaced relationship to one another.

Referring in greater detail to the structure of the disclosed rectifier stack 11, it includes a plurality of plates 24, each of which has an adjacent contact plate or electrode 25, with a layer of material such as selenium between each plate and its adjacent electrode. The plates, each paired with an adjacent electrode, are spaced in the stack by spacing washers 26. The plates, electrodes and spacing washers of a stack have openings 28 in the mid-portions thereof, which openings are of a size to fit snugly upon a tubular insulating member 27, and the openings in at least one of said parts may be of the same configuration as the tubular insulating member. The disclosed rectifier assembly being particularly adapted to withstand shocks and vibrations, and also because excessive pressure has a detrimental effect upon the resistance characteristic of the rectifier, the external surfaces of the tubular insulating member 27 is made non-circular in form by providing flat side surfaces 29 thereon and corresponding flat surfaces 30 in the openings 28 of the plates. These flat surfaces prevent rotational movements between the parts of the stack without the application of excessive pressure at the ends of the stack for maintaining the parts in their assembled and engaged relationship.

As shown in Fig. 7, spacing washers 32 are provided at the opposite ends of the stack. The tubular insulating member 27 extends through the plates 24, electrodes 25, spacing washers 26 and spacing washers 32 of the stack, as well as through the end supporting plates 12 and 13. A rod 33 having threaded portions 34 at its opposite ends extends through the tubular insulating member 27 and through the mid-portions of the proposed end supporting plates 12 and 13. At opposite ends of the stack, insulating washers 35 separate the spacing washers 32 from the end supporting plates 12 and 13, so as to insulate those end supporting plates from the stack. The spacing washers 32 and the insulating washers 35 serve to space the supporting plates 12 and 13 from the opposite ends of the stack. In the disclosed structure, also, the openings in the end supporting plates 12 and 13 conform to the flat side surfaces of the tubular insulating member to prevent those end supporting plates for turning relative to the stack. The parts of the stack and their associated supporting plates are securely and quite rigidly held in their assembled relationship by fastening means, such as nuts 36 and associated washers 37.

As is understood in the rectifier art, the number of rectifier elements connected in series in a particular stack is determined by the voltage rating of the rectifier, and the order and arrangement of the elements in the stack, as well as the positions of the electrical connections to the stack are determined by factors including the number of phases of the input current and whether or not the rectification is to be full or half wave.

In the disclosed full wave rectifier for use with a three phase alternating current power source, flat connecting strips 38, 39 and 40 have their inner ends anchored at separated positions in the stack between the spacing washers 26 and extend outwradly for connection to the input terminal 20. At another part of the stack, flat connecting strips 42, 43 and 44 have their inner ends anchored between spacing washers at spaced positions in the stack and extend outwardly for connection to the input terminal 22. Likewise, connecting strips 45, 46 and 47 have their inner ends anchored between spacing washers at spaced positions and at another part of the stack, and extend outwardly for connection to the input terminal 23. At other spaced positions in the stack, flat connecting strips 48, 49, 50, 52 and 53 have their inner ends anchored between the spacing washers of the stack and extend outwardly for connection to the output terminal 19. In the same manner, connecting strips 54, 55, 56, 57 and 58 extend outwardly from additional positions in the stack for connection to the output terminal 18.

The structure of the rectifier stack being centered about the rod 33 and tubular insulating member 27, with the stack extending axially therealong, the connecting strips for making connections from the input and output terminals to selected parts of the stack in a particular stack arrangement are grouped with the connecting strips for each terminal in parallel relationship axially of the stack and with the connecting strips for the various terminals spaced circumferentially of the stack.

The terminals 18, 19, 20, 22 and 23 are desirably alike in structure; those utilized in the disclosed assembly being of the type shown in Fig. 9. Each such terminal has a threaded stem portion 59, at one end of which is a flattened end portion 60, through which end portion there is a cross bore 62. For mounting each of the terminals on the panel 16, as shown in Fig. 6, I have provided a nut 63 which is threaded on to the terminal's stem to a position adjacent the flattened end portion 60. Each of the terminals extends through an appropriate bore in the panel 16, with the nut 63 adjacent the inner face of the panel, so that the flattened end portion is between the panel and the rectifier stack. Washers 64 and lockwashers 65 are placed on the terminals on opposite sides of the panel, and a second nut 66 is utilized on each terminal for securing the terminal in place on the panel. A third nut 67 and washers 68 are provided on each terminal for gripping a connecting lead or bus bar. From this description of the terminals, it may be readily understood that each such terminal is firmly secured to the panel 16, so as to provide a firm anchorage for the connecting leads of bus bars, as well as for the connector strips from the stack.

Figure 4:
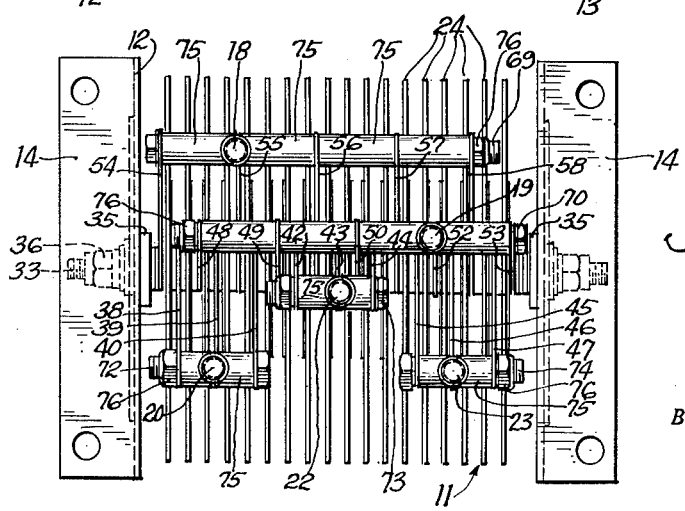
Fig. 4 is a top plan view of my preferred rectifier assembly taken substantially on a line 4—4 of Fig. 2 and in the direction of the accompanying arrows, and having some of the parts removed.

In order to provide further for the firm anchorage of each group of connector strips to one of the terminals, as illustrated in Figs. 4 and 6, bolts 69, 70, 72, 73 and 74 extend through the respective cross bores in the flattened end portions 60 of the terminals 18, 19, 20, 22 and 23. Spacing collars 75 of appropriate length are placed on the bolts 69, 70, 72, 73 and 74 on opposite sides of their respective terminals and between each of the adjacent connecting strips of a group which is to be attached to a single terminal. The bolts 69, 70, 72, 73 and 74 extend through the outer ends of the connecting strips of each group, whereby nuts 76 on the respective bolts are tightened to secure the bolts and their respective spacing collars and connecting strips into a relatively rigid assembly which is firmly secured to each of the terminals. Thus, with the disclosed structure, the plates and electrodes of the stack are secured against relative rotation, the connecting strips are firmly anchored at their opposite ends to the stack and the respective terminals, and the terminals are anchored in a manner which prevents the transmission of forces and vibrations through the terminals to the connecting strips and the stack.

Figure 1:
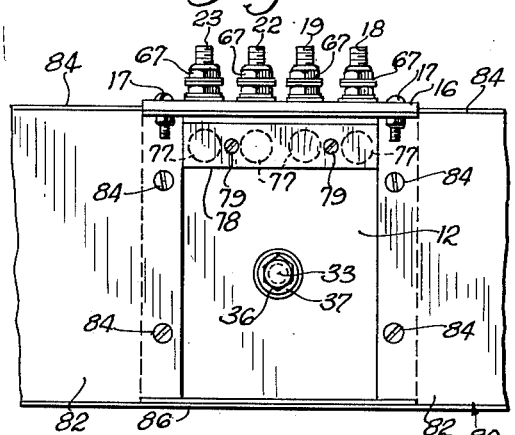
Figs. 1 and 2 are respectively side elevational and end sectional views illustrating the structure of a preferred embodiment of my rectifier assembly and its adaptation to installation in an air duct.
Figure 5:
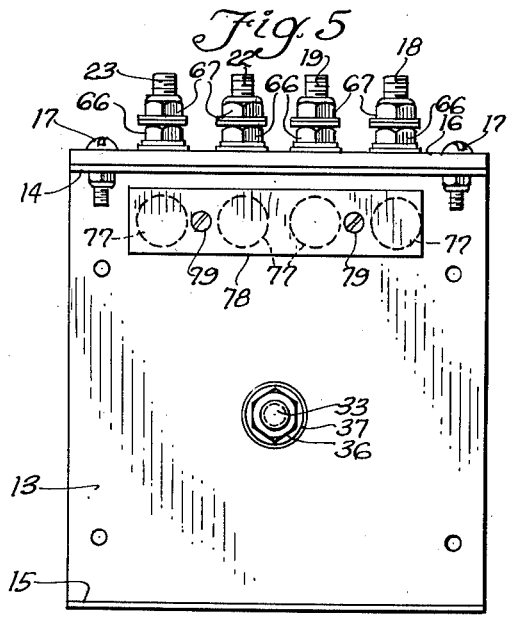
Fig. 5 is a side elevational view of the rectifier assembly.

In order to facilitate the assembly of my disclosed rectifier unit, the supporting plates 12 and 13, as shown in Figs. 1 and 5, are provided with openings 77 near the panel 16 and aligned with the bolts 69, 70, 72, 73 and 74. These openings provide access for tightening the nuts 76 on the respective bolts during assembly. After assembly, plates 78 are secured to each of the supporting plates 12 and 13 by fastening means, such as screws 79, for covering the openings 77.

In addition to providing a rectifier assembly which is adapted to withstand shock and vibration, the disclosed structure is also adapted to fit into and form a part of an air flow conduit 80, as shown in Figs. 1 and 2. Such placement not only affords a satisfactory mounting position for the rectifier but also insures a supply of cooling air which is essential for heavy duty operation. Side plates 82 and 83 which form opposite sides of the conduit 80 are secured to the supporting plates by fastening means, such as screws 84, so that each of the supporting plates fills a gap between spaced end portions of each of the conduit side plates. Likewise, the panel 16 covers an opening in a top plate 84 in the conduit, so that the rectifier assembly is removable through the spaces provided between the ends of the rectifier side and top plates. A bottom plate 86 of the conduit 80 is continuous and is secured to the lower flanges 15 of the supporting plates 12 and 13 by fastening means such as screws 87. With the disclosed structure and arrangement, the axis of the stack extends laterally of the conduit and the cooling air flowing through the conduit passes between the plates and electrodes of the stack to afford effective cooling action with a minimum of resistance to the air flow through the conduit.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A rectifier assembly comprising, in combination, a rectifier stack including a plurality of plates and electrodes arranged in pairs separated by rectifying layers and wherein the pairs are separated by spacing washers and disposed and electrically connected to provide a predetermined rectifying circuit, a tubular insulating member, said plates, electrodes and washers having openings therein and being assembled together on the tubular insulating member, the external surface of said tubular insulating member and said openings in the plates being similarly shaped with flat surface portions to prevent rotational movements of the plates, flanged supporting plates insulated from the stack and mounted at opposite ends of the stack, said flanged plates being disposed over said tubular insulating member and having openings corresponding to the section of said insulating member so that said flanged plates are rotatively locked to said insulating member, fastening means extending through the tubular insulating member for securing the stack and supporting plates in assembled relationship, an insulating panel secured to the supporting plates, terminals secured to the insulating panel, and electrically conductive connecting strips each having their opposite ends anchored to one of the terminals and between said spacing washers.

2. A rectifier assembly as defined in claim 1 adapted to use for providing direct current output to a single pair of terminals from a polyphase alternating current source, and wherein said terminals include two output terminals and a plurality of input terminals, and each of said output terminals having a plurality of said connecting strips anchored thereto through a laterally extending and substantially rigid post structure having a rigid spacing element extending between the connecting strips connected thereto.

3. A rectifier assembly as defined in claim 2, and wherein each of said input terminals has a plurality of said connecting strips anchored thereto through a laterally extending and substantially rigid post structure having a rigid spacing element between the connecting strips connected thereto.

4. A rectifier assembly comprising, in combination, a rectifier stack of the dry-disc type, support plates secured to opposite ends of the stack and electrically insulated therefrom, a panel secured to and extending between the support plates in spaced relationship to the stack, terminals secured to the panel in spaced relationship to one another, cross posts of rigid construction rigidly secured to each of the terminals between the panel and the stack, a plurality of electrically conductive connecting strips extending outwardly at spaced positions along the stack for making electrical connections thereto, and a plurality of said connecting strips rigidly secured at fixed and spaced positions to each of said cross posts.

5. A rectifier assembly as defined in claim 4, and wherein said terminals comprise screws with laterally flattened end portions, said flattened end portions having bores therethrough transverse to the screw axes, and said cross posts including threaded members carrying tubular spacers on opposite sides of the flattened end portions.

6. In a rectifier assembly, the combination comprising a rectifier stack including a plurality of plates and electrodes, said plates and electrodes each having an opening through the midportion thereof, a tubular member of insulating material fitting snugly in the openings of the plates and electrodes, the openings in said plates and electrodes being non-circular and conforming to the exterior sectional shape of the tubular member to prevent rotational movement of the plates and electrodes relative thereto, a rod extending axially through the tubular member and having a threaded end portion projecting from the tubular member, support plates secured to the stack at opposite ends of the rod, a panel secured to the support members, and terminals mounted on the panel and electrically connected to the stack.

7. In a rectifier assembly as defined in claim 6, said support plates having openings therein for receiving the tubular member and conforming thereto to prevent relative rotational movements between the support plates and the stack.

8. In a rectifier assembly, the combination comprising a rectifier stack, a relatively rigid panel fixedly secured to the stack and extending along one side of the stack in spaced relationship thereto, terminals securely mounted on the panel and extending therethrough in spaced relationship to one another, each of said terminals having a substantially rigid cross post structure secured thereto adjacent the stack, and a plurality of connecting strips extending linearly from the stack and rigidly secured at spaced positions to each of the cross post structures.

JAMES H. HALL.

REFERENCES CITED

The following references are of record in the file of this patent:

UNITED STATES PATENTS

| Number | Name | Date |
|---|---|---|
| 1,728,537 | Geiger | Sept. 17, 1929 |
| 1,801,836 | Auman | Apr. 21, 1931 |
| 1,865,213 | Ruben | June 28, 1932 |
| 1,865,450 | Zierdt | July 5, 1932 |
| 2,274,296 | Hughes et al. | Feb. 24, 1942 |
| 2,434,960 | Richards | Jan. 27, 1948 |